June 13, 1939. W. E. SOMERVILLE 2,162,130
WIRE ROPE OR CABLE
Filed July 1, 1938 2 Sheets-Sheet 2
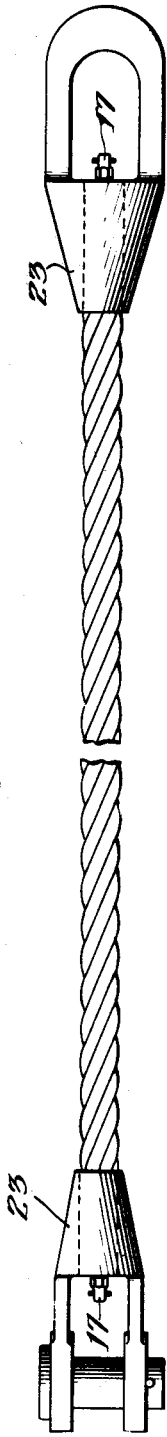
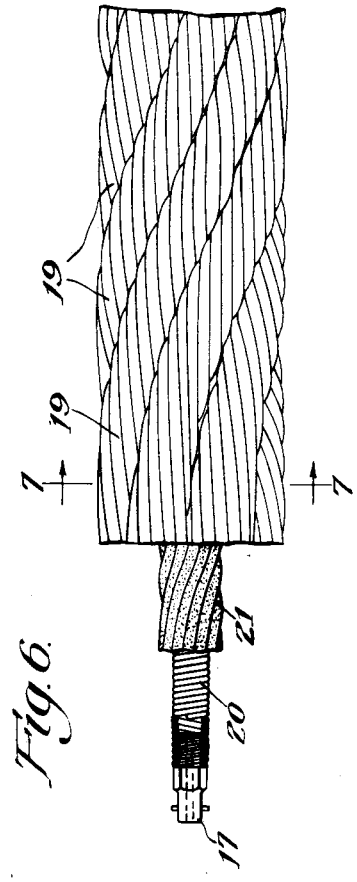
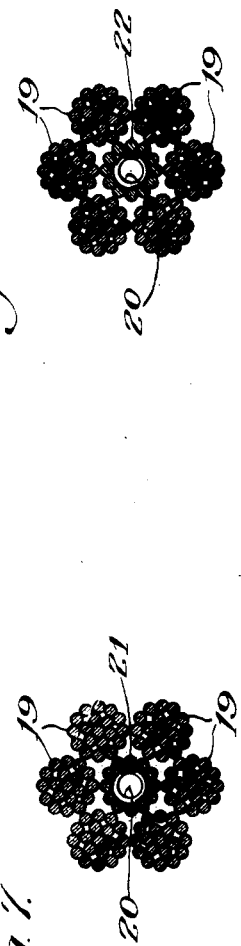
Inventor:
William E. Somerville
By: [signature]
Attorney Patented June 13, 1939

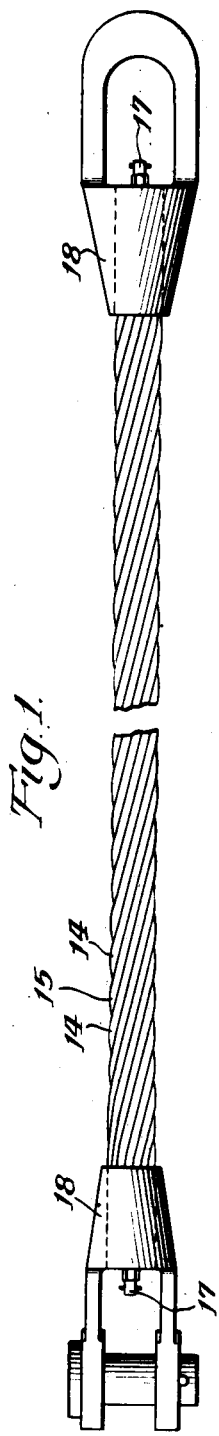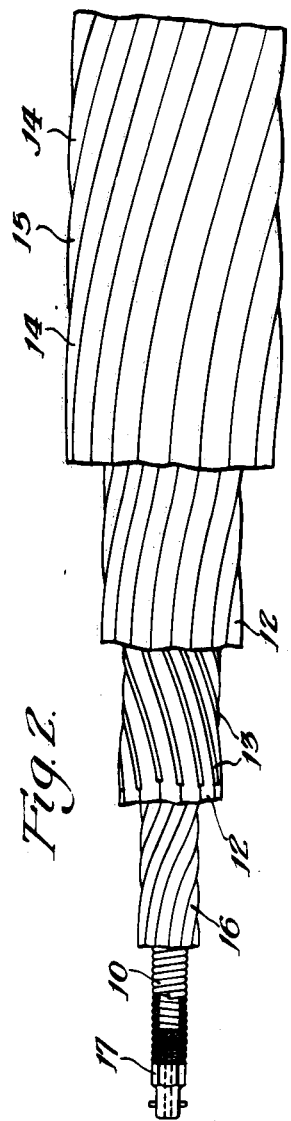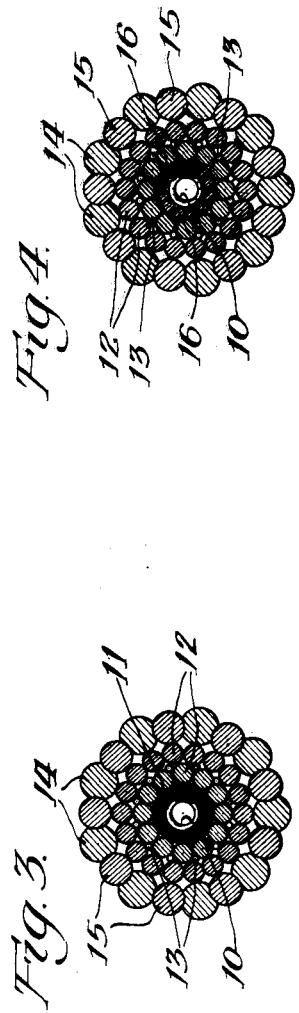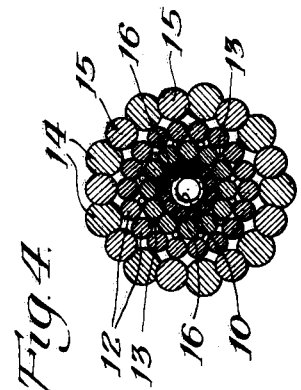

2,162,130

UNITED STATES PATENT OFFICE 2,162,130

WIRE ROPE OR CABLE

William E. Somerville, Coal City, Ill.

Application July 1, 1938, Serial No. 217,097

6 Claims. (Cl. 57—145)

This invention relates to improvements in wire ropes or cables and one of the objects of the same is to provide in a rope or cable of this character improved means for oiling or greasing the same.

Heretofore it has been customary in order to lubricate or oil a cable or rope of this character, to apply the grease or lubricant to the outside of the cable, and while good results have been obtained by this method it has been found that a large portion of the oil or grease does not find its way into the rope or cable between the strands and the entire rope or cable will not be lubricated It is one of the objects of the present invention to provide means whereby the lubricant may be applied to the rope or cable from the inside thereof after the rope or cable has been installed for use and which lubricant will work its way outwardly so as to thoroughly lubricate the same, and at the same time not interfere with the flexibility of the rope or cable.

A further object is to provide improved means for locking or securing the strands or wires together so that in the event any one or more of the wires should break they will not unravel and at the same time an improved lock coil rope will be produced without the necessity of preforming the wires or strands of the rope.

To the attainment of these ends and the accomplishment of other new and useful objects as will appear, the invention consists in the features of novelty in the construction, combination and arrangement of the several parts hereinafter more fully described and claimed and shown in the accompanying drawings illustrating this invention, and in which Figure 1 is a view in elevation of a single strand rope or cable constructed in accordance with the principles of this invention.

Figure 2 is a view in elevation of a portion of a multiple strand rope or cable with portion of the strands removed.

Figure 3 is a transverse sectional view of a wire rope or cable constructed in accordance with the principles of this invention showing one form of core.

Figure 4 is a view similar to Figure 3 showing another form of core.

Figure 5 is a view of a multiple strand rope or cable similar to Figure 1.

Figure 6 is a detail view in elevation on an enlarged scale, of a multiple strand rope or cable, with portions of the respective strands removed.

Figure 7 is a detail sectional view taken on line 7—7, Figure 6.

Figure 8 is a view similar to Figure 7 of another form of the invention.

In the form of the invention shown in Figures 1 to 4 there is shown a single strand rope or cable comprising a flexible hollow core 10 constructed of any suitable material preferably in the form of a coil of wire with the convolutions in close proximity to each other.

Encompassing the core 10 is a supplemental core 11 which in the form of the invention shown in Figure 3 is constructed of strands of any suitable fibrous material such for instance as hemp and encompassing the supplemental core are layers of wires 12, any number of layers being provided according to the diameter of the strand it is desired to produce, and if desired intermediate wires 13 may also be provided.

The outer layer of the strand is formed of wires 14 and 15 alternately arranged, and each of the respective wires is normally of uniform cross-sectional diameter. The wires 14 are constructed of material considerably softer than the material from which the wires 15 are constructed, so that when the wires 14 and 15 are twisted or coiled about the other layers and the core and the completed strand passed through the usual die, the wires 15 will imbed themselves in the adjacent wires 14 causing the shape of the wires of the softer material to be changed in cross-section, thereby producing a locked coil rope.

With this construction, and should one of the wires of the outer or peripheral layer become broken, it will not unravel but will be held locked in position against such unraveling.

In the form of the invention shown in Figure 4, the supplemental coil 16 is formed of metal, such as steel, and is flexible so as not to interfere with the flexibility of the cable.

At each end of the core 10 there is arranged a closure 17 which may be of any desired or suitable construction but is preferably of a construction that an ordinary "grease gun" can be applied thereto so that the lubricant can be forced through the coupling 17 and into the core 10. The core being hollow and being formed of coiled material, the lubricant will find its way between the convolutions, and in the form of the invention shown in Figure 3 will contact with the fibrous core 12 to be partially absorbed thereby and will pass through the convolutions or strands of the core 16 in the form of the invention shown in Figure 4.

With this construction it will be manifest that the lubricant will find its way between the layers of wires forming the cable or strand and will lubricate the same from the inside toward the periphery thereof. This will result in a thorough and complete lubrication of the strand or cable.

If desired, suitable heads 18 may be secured to the ends of the strand.

In the form of the invention shown in Figures 5 to 8 a plurality of strands 19 may be employed which encompass a hollow flexible core 20 similar to the core 10. In the form shown in Figure 7 a supplemental core 21 constructed of any suitable fibrous material, such as hemp and similar to the core shown in Figure 3, is employed and encompasses central core 20. In the form shown in Figure 8 a supplemental metallic core 22 is employed and encompasses the hollow flexible core 20.

In the forms shown in Figures 5 to 8, the plurality of strands 19 are twisted about the core in the usual manner and heads 23 may be secured to the ends of the cable.

It will therefore be manifest that with the present invention a thorough and efficient lubrication will be provided and in the manufacture of the strands round wires may be employed and the necessity of providing preformed wires to produce a lock coil structure will be obviated.

While the preferred forms of the invention have been herein shown and described it is to be understood that various changes may be made in the details of construction and in the combination and arrangement of the several parts, within the scope of the claims, without departing from the spirit of this invention.

What is claimed as new is:

1. A rope or cable embodying a stranded body, the periphery of the body comprising a plurality of separate elements contacting each other, certain of said elements being formed of softer material than certain other of said elements, whereby the harder elements will be seated or imbedded in the softer elements.

2. A rope or cable embodying a stranded body, the periphery of the body comprising a plurality of separate elements, contacting each other, certain of said contacting elements being formed of softer material than certain other of said elements, whereby the harder elements will be seated or imbedded in the softer elements, the hard and soft elements being alternately arranged.

3. A wire rope or cable comprising a body formed of a plurality of strand elements spirally arranged and extending in general directions lengthwise of the body, adjacent elements contacting each other, certain of said contacting elements being imbedded in other of the contacting elements to provide a lock coil cable, the alternate ones of the contacting elements being formed of material softer than the next adjacent elements.

4. A wire rope or cable embodying a stranded body, the periphery of the body comprising a plurality of separate elements contacting each other, certain of said contacting elements being formed of softer material than certain of said other elements, whereby the harder elements will be seated or imbedded in the softer elements, and a hollow flexible core encompassed by said elements.

5. A wire rope or cable comprising a body formed of a plurality of strand elements spirally arranged and extending in general directions lengthwise of the body, adjacent elements contacting each other, certain of said contacting elements being imbedded in the other of the contacting elements to provide a lock coil, the alternate ones of the contacting elements being formed of material softer than the next adjacent elements, and a hollow flexible core encompassed by said elements.

6. A wire rope or cable comprising a body formed of a plurality of strand elements spirally arranged and extending in general directions lengthwise of the body, adjacent elements contacting each other, certain of said contacting elements being imbedded in the other of the contacting elements to provide a lock coil, the alternate ones of the contacting elements being formed of material softer than the next adjacent elements, and a hollow flexible core encompassed by said elements, said core formed of spiral convolutions.

WILLIAM E. SOMERVILLE.